(12) United States Patent
Enami et al.

(10) Patent No.: US 6,380,301 B1
(45) Date of Patent: Apr. 30, 2002

(54) THERMALLY CONDUCTIVE SILICONE RUBBER COMPOSITION

(75) Inventors: Hiroji Enami; Masayuki Onishi; Tadashi Okawa; Masaaki Amako, all of Chiba (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 0 days.

(21) Appl. No.: 09/702,640

(22) Filed: Nov. 1, 2000

(30) Foreign Application Priority Data

Nov. 15, 1999 (JP) .............................. 11-324086

(51) Int. Cl.$^7$ .................. C08L 83/07; C08L 83/05; C08L 83/06
(52) U.S. Cl. .................. 524/588; 528/14; 528/15; 528/24; 528/31; 528/32; 528/33; 428/405; 525/478; 524/437
(58) Field of Search ............... 528/14, 15, 24, 528/31, 33; 428/405; 525/478; 524/588, 437

(56) References Cited

U.S. PATENT DOCUMENTS 5,679,725 A * 10/1997 Fisher

\* cited by examiner

*Primary Examiner*—Robert Dawson
*Assistant Examiner*—Kuo-Liang Peng
(74) *Attorney, Agent, or Firm*—Larry A. Milco; Catherine Brown

(57) ABSTRACT

A thermally conductive silicone rubber composition, comprising (A) a curable organopolysiloxane (B) a curing agent; and (C) a filler prepared by treating the surface of a thermally conductive filler with an oligosiloxane having a formula selected from (i) $(R^1O)_a Si(OSiR^2_3)_{(4-a)}$ and (ii) $(R^1O)_a R^2_{(3-a)} SiO[R^2_2 SiO]_n Si(OSiR^2_3)_b R^2_{(3-b)}$ wherein $R^1$ is alkyl, each $R^2$ is independently a monovalent hydrocarbon group free of aliphatic unsaturation, subscript a is an integer from 1 to 3, b is an integer from 1 to 3, and n is an integer having a value greater than or equal to 0.

16 Claims, No Drawings

THERMALLY CONDUCTIVE SILICONE RUBBER COMPOSITION

FIELD OF THE INVENTION

The present invention relates to a thermally conductive silicone rubber composition and more particularly to a thermally conductive silicone rubber composition possessing excellent handling properties and moldability even though it contains a large amount of thermally conductive filler.

BACKGROUND OF THE INVENTION

In recent years, following advances in the degree of density and integration of hybrid ICs and printed circuit boards, on which transistors, ICs, memory elements, and other electronic parts are mounted, various thermally conductive silicone rubber compositions have been employed in order to enhance the efficiency of heat dissipation. Addition-curable thermally conductive silicone rubber compositions are known in the art. For example, Japanese Laid-Open Patent Application No. Sho 61[1986]-157569 discloses a thermally conductive silicone rubber composition comprising a vinyl group-containing organopolysiloxane, an organohydrogenpolysiloxane, a thermally conductive filler, a tackifier selected from an alkyl titanate, an epoxysilane, and an aminosilane, and a platinum catalyst.

Japanese Laid-Open Patent Application No. Sho 62[1987]-184058 discloses a thermally conductive silicone rubber composition comprising an organopolysiloxane containing, on the average, two alkenyl groups per molecule, an organopolysiloxane containing, on the average, three or more silicon-bonded hydrogen atoms per molecule, a thermally conductive filler comprising zinc oxide and magnesium oxide, a filler treating agent, and a platinum catalyst.

Japanese Laid-Open Patent Application No. Sho 63[1988]-251466 discloses a thermally conductive silicone rubber composition comprising an organopolysiloxane containing at least 0.1 mol of alkenyl groups per molecule, an organohydrogenpolysiloxane containing at least two silicon-bonded hydrogen atoms in one molecule, a spherical alumina powder with an average particle size of from 10 μm to 50 μm, a spherical or non-spherical alumina powder with an average particle size of less than 10 μm, and platinum or a platinum compound.

Japanese Laid-Open Patent Application No. Hei 02[1990]-041362 discloses a thermally conductive silicone rubber composition comprising an alkenyl group-containing an organopolysiloxane, an organohydrogenpolysiloxane, an alumina powder having no definite shape with an average particle size of from 0.1 μm to 5 μm, a spherical alumina powder with an average particle size of from 5 μm to 50 μm, and a platinum catalyst.

Japanese Laid-Open Patent Application No. Hei 02[1990]-097559 teaches a thermally conductive silicone rubber composition comprising an organopolysiloxane containing at least two silicon-bonded alkenyl groups in one molecule, an organohydrogenpolysiloxane containing at least three silicon-bonded hydrogen atoms in one molecule, a thermally conductive filler with an average particle size of from 5 μm to 20 μm, an adhesion assistant, and platinum or a platinum compound.

The problem with such thermally conductive silicone rubber compositions, however, is that the content of the thermally conductive fillers, which are added to the compositions in order to improve the coefficient of thermal conductivity of the silicone rubber obtained by curing them, must of necessity be high, which leads to a deterioration in the handling properties and moldability of the resultant silicone rubber compositions.

SUMMARY OF THE INVENTION

An object of the present invention is to provide a thermally conductive silicone rubber composition possessing excellent handling properties and moldability even though it contains a large amount of thermally conductive filler added in order to obtain silicone rubber of high thermal conductivity.

The present invention is directed to a thermally conductive silicone rubber composition comprising:

(A) a curable organopolysiloxane;

(B) a curing agent; and (C) a filler prepared by treating the surface of a thermally conductive filler with an oligosiloxane having a formula selected from (i) $(R^1O)_a Si(OSiR^2_3)_{(4-a)}$ and (ii) $(R^1O)_a R^2_{(3-a)} SiO[R^2_2 SiO]_n Si(OSiR^2_3)_b R^2_{(3-b)}$ wherein $R^1$ is alkyl, each $R^2$ is independently a monovalent hydrocarbon group free of aliphatic unsaturation, subscript a is an integer from 1 to 3, b is an integer from 1 to 3, and n is an integer having a value greater than or equal to 0.

The thermally conductive silicone rubber composition of the present invention is characterized by excellent handling properties and moldability even though it contains a large amount of thermally conductive filler added in order to obtain silicone rubber of high thermal conductivity.

DETAILED DESCRIPTION OF THE INVENTION

A thermally conductive silicone rubber composition according to the present invention, comprises:

(A) a curable organopolysiloxane;

(B) a curing agent; and (C) a filler prepared by treating the surface of a thermally conductive filler with an oligosiloxane having a formula selected from (i) $(R^1O)_a Si(OSiR^2_3)_{(4-a)}$ and (ii) $(R^1O)_a R^2_{(3-a)} SiO[R^2_2 SiO]_n Si(OSiR^2_3)_b R^2_{(3-b)}$ wherein $R^1$ is alkyl, each $R^2$ is independently a monovalent hydrocarbon group free of aliphatic unsaturation, subscript a is an integer from 1 to 3, b is an integer from 1 to 3, and n is an integer having a value greater than or equal to 0.

There are no limitations concerning the cure mechanism of the present composition; thus, one may suggest a hydrosilation reaction, a condensation reaction, or a free radical reaction, among which a hydrosilation reaction or a condensation reaction are preferred.

The curable organopolysiloxane of component (A) is the main component of the present composition, and when the present composition is hydrosilation-curable, component (A) is an organopolysiloxane having, on the average, not less than 0.1 silicon-bonded alkenyl groups per molecule, preferably, an organopolysiloxane having, on the average, not less than 0.5 silicon-bonded alkenyl groups per molecule, and especially preferably, an organopolysiloxane having, on the average, not less than 0.8 silicon-bonded alkenyl groups per molecule. When the average number of silicon-bonded alkenyl groups per molecule is lower than the lower limit of the above-mentioned range, the resultant composition does not completely cure. Examples of silicon-bonded alkenyl groups include vinyl, allyl, butenyl, pentenyl, and hexenyl, of which vinyl is preferred. Examples of silicon-bonded groups in the organopolysiloxane other than the alkenyl include methyl, ethyl, propyl, butyl, pentyl, hexyl, and other alkyl groups; cyclopentyl, cyclohexyl, and other cycloalkyl groups; phenyl, tolyl, xylyl, and other aryl groups; benzyl, phenetyl, and other aralkyl groups; and 3,3,3-trifluoropropyl, 3-chloropropyl, and other halogenated alkyl groups. Among these groups, alkyl and aryl are preferred, and methyl and phenyl are particularly preferred.

Although there are no limitations concerning the viscosity of the organopolysiloxane, its viscosity at 25° C. should preferably be within the range of from 50 mPa·s to 100,000 mPa·s, and, especially preferably, within the range of from 100 mPa·s to 50,000 mPa·s. When its viscosity at 25° C. is lower than the lower limit of the above-mentioned range, the physical characteristics of the resultant silicone rubber tend to markedly deteriorate, and, on the other hand, when it exceeds the upper limit of the above-mentioned range, the handling properties of the resultant silicone rubber composition tend to markedly deteriorate.

There are no limitations concerning the molecular structure of this type of organopolysiloxane, and, for example, it may be a linear, branched, partially branched linear, or dendritic configuration; preferably, it is a linear or partially branched linear configuration. In addition, the organopolysiloxane can be a homopolymer having such a molecular structure, a copolymer made up of such molecular structures, or a mixture of these polymers.

Examples of organopolysiloxanes suitable for use in the hydrosilation-curable silicone compositions of the present invention include a dimethylpolysiloxane having both terminal ends of the molecular chain blocked by dimethylvinylsiloxy groups, a dimethylpolysiloxane having both terminal ends of the molecular chain blocked by methylphenylvinylsiloxy groups, a methylphenylsiloxane-dimethylsiloxane copolymer having both terminal ends of the molecular chain blocked by dimethylvinylsiloxy groups, a methylvinylsiloxane-dimethylsiloxane copolymer having both terminal ends of the molecular chain blocked by dimethylvinylsiloxy groups, a methylvinylsiloxane-dimethylsiloxane copolymer having both terminal ends of the molecular chain blocked by trimethylsiloxy groups, a methyl(3,3,3-trifluoropropyl)polysiloxane having both terminal ends of the molecular chain blocked by dimethylvinylsiloxy groups, a methylvinylsiloxane-dimethylsiloxane copolymer having both terminal ends of the molecular chain blocked by silanol groups, a methylphenylsiloxane-methylvinylsiloxane-dimethylsiloxane copolymer having both terminal ends of the molecular chain blocked by silanol groups, and an organosiloxane copolymer made up of siloxane units represented by the formula $(CH_3)_3SiO_{1/2}$, siloxane units represented by the formula $(CH_3)_2(CH_2=CH)SiO_{1/2}$, siloxane units represented by the formula $CH_3SiO_{3/2}$, and siloxane units represented by the formula $(CH_3)_2SiO_{2/2}$.

When the present composition is condensation-curable, component (A) is an organopolysiloxane having at least two silanol groups or silicon-bonded hydrolyzable groups in one molecule. Examples of silicon-bonded hydrolyzable groups include methoxy, ethoxy, propoxy, and other alkoxy groups; vinyloxy and other alkenoxy groups; methoxyethoxy, ethoxyethoxy, methoxypropoxy and other alkoxyalkoxy groups; acetoxy, octanoyloxy and other acyloxy groups; dimethylketoxime, methylethylketoxime, and other ketoxime groups; isopropenyloxy, 1-ethyl-2-methylvinyloxy and other alkenyloxy groups; dimethylamino, diethylamino, butylamino, and other amino groups; dimethylaminoxy, diethylaminoxy, and other aminoxy groups; N-methylacetamide, N-ethylacetamide, and other amide groups. Examples of groups in the organopolysiloxane other than the silanol or silicon-bonded hydrolyzable groups include methyl, ethyl, propyl, and other alkyl groups; cyclopentyl, cyclohexyl, and other cycloalkyl groups; vinyl, allyl, and other alkenyl groups; phenyl, naphthyl, and other aryl groups; and 2-phenylethyl and other aralkyl groups.

Although there are no limitations concerning the viscosity of the organopolysiloxane, it is preferable that at 25° C. it should be within the range of from 20 mPa·s to 100,000 mPa·s, and especially preferably, within the range of from 100 mPa·s to 100,000 mPa·s. When its viscosity at 25° C. is lower than the lower limit of the above-mentioned range, the physical characteristics of the resultant silicone rubber tend to markedly deteriorate, and, on the other hand, when it exceeds the upper limit of the above-mentioned range, the handling properties of the resultant silicone rubber composition tend to markedly deteriorate.

There are no limitations concerning the molecular structure of the organopolysiloxane; for example, it may be a linear, partially branched linear, branched, cyclic, or dendritic configuration; especially preferably, it is a linear configuration.

Examples of organopolysiloxanes suitable for use in the condensation-curable compositions of the present invention include a dimethylpolysiloxane having both terminal ends of the molecular chain blocked by silanol groups, a methylphenylsiloxane-dimethylsiloxane copolymer having both terminal ends of the molecular chain blocked by silanol groups, a dimethylpolysiloxane having both terminal ends of the molecular chain blocked by trimethoxysiloxy groups, a methylphenylsiloxane-dimethylsiloxane copolymer having both terminal ends of the molecular chain blocked by trimethoxysilyl groups, a dimethylpolysiloxane having both terminal ends of the molecular chain blocked by methyldimethoxysiloxy groups, a dimethylpolysiloxane having both terminal ends of the molecular chain blocked by triethoxysiloxy groups, and a dimethylpolysiloxane having both terminal ends of the molecular chain blocked by trimethoxysilylethyl groups.

When the present composition is free radical-curable, there are no limitations concerning the curable organopolysiloxane of component (A), but it is preferable to use an organopolysiloxane having at least one silicon-bonded alkenyl group per molecule. Examples of silicon atom-bonded groups in the organopolysiloxane include ethyl, ethyl, propyl, butyl, pentyl, hexyl, and other alkyl groups; cyclopentyl, cyclohexyl, and other cycloalkyl groups; vinyl, allyl, butenyl, pentenyl, hexenyl, and other alkenyl groups; phenyl, tolyl, xylyl, and other aryl groups; benzyl, phenetyl, and other aralkyl groups; and 3,3,3-trifluoropropyl, 3-chloropropyl, and other halogenated alkyl groups. Of these groups, alkyl, alkenyl, and aryl are preferred, and methyl, vinyl, and phenyl as particularly preferred.

Although there are no limitations concerning the viscosity of the organopolysiloxane, its viscosity at 25° C. should preferably be within the range of from 50 mPa·s to 100,000 mPa·s, and, especially preferably, within the range of from 100 mPa·s to 50,000 mPa·s. This is due to the fact that when its viscosity at 25° C. is lower than the lower limit of the above-mentioned range, the physical characteristics of the resultant silicone rubber tend to markedly deteriorate, and, on the other hand, when it exceeds the upper limit of the above-mentioned range, the handling properties of the resultant silicone rubber composition tend to markedly deteriorate.

There are no limitations concerning the molecular structure of this type of organopolysiloxane; for example, it may be a linear, branched, partially branched linear, or dendritic configuration; preferably, it is a linear or partially branched linear configuration. In addition, the organopolysiloxane can be a homopolymer having such a molecular structure, a copolymer made up of such molecular structures, or a mixture of these polymers.

Examples of organopolysiloxanes suitable for use in the free radical-curable compositions of the present invention include a dimethylpolysiloxane having both terminal ends of the molecular chain blocked by dimethylvinylsiloxy groups, a dimethylpolysiloxane having both terminal ends of the molecular chain blocked by methylphenylvinylsiloxy groups, a methylphenylsiloxane-dimethylsiloxane copolymer having both terminal ends of the molecular chain blocked by dimethylvinylsiloxy groups, a methylvinylsiloxane-dimethylsiloxane copolymer having both terminal ends of the molecular chain blocked by dimethylvinylsiloxy groups, a methylvinylsiloxane-dimethylsiloxane copolymer having both terminal ends of the molecular chain blocked by trimethylsiloxy groups, a methyl(3,3,3-trifluoropropyl)polysiloxane having both terminal ends of the molecular chain blocked by dimethylvinylsiloxy groups, a methylvinylsiloxane-dimethylsiloxane copolymer having both terminal ends of the molecular chain blocked by silanol groups, a methylphenylsiloxane-methylvinylsiloxane-dimethylsiloxane copolymer having both terminal ends of the molecular chain blocked by silanol groups, and an organosiloxane copolymer made up of siloxane units represented by the formula $(CH_3)_3SiO_{1/2}$, siloxane units represented by the formula $(CH_3)_2(CH_2=CH)SiO_{1/2}$, siloxane units represented by the formula $CH_3SiO_{3/2}$, and siloxane units represented by the formula $(CH_3)_2SiO_{2/2}$.

When the present composition is hydrosilation-curable, the curing agent of component (B) consists of a platinum catalyst and an organopolysiloxane having, on the average, not less than two silicon-bonded hydrogen atoms per molecule. Examples of silicon-bonded groups contained in the organopolysiloxane include ethyl, ethyl, propyl, butyl, pentyl, hexyl, and other alkyl groups; cyclopentyl, cyclohexyl, and other cycloalkyl groups; phenyl, tolyl, xylyl, and other aryl groups; benzyl, phenetyl, and other aralkyl groups; and 3,3,3-trifluoropropyl, 3-chloropropyl, and other halogenated alkyl groups. Of the preceding groups, alkyl and aryl are preferred, and methyl and phenyl are particularly preferred.

Although there are no limitations concerning the viscosity of the organopolysiloxane, its viscosity at 25° C. should preferably be within the range of from 1 mPa·s to 100,000 mPa·s, and, especially preferably, within the range of from 1 mPa·s to 5,000 mPa·s.

There are no limitations concerning the molecular structure of this type of organopolysiloxane; for example, it may be a linear, branched, partially branched linear, cyclic, or dendritic configuration. In addition, the organopolysiloxane can be a homopolymer having such a molecular structure, a copolymer made up of such molecular structures, or a mixture thereof.

Examples such organopolysiloxanes include a dimethylpolysiloxane having both terminal ends of the molecular chain blocked by dimethylhydrogensiloxy groups, a methylhydrogensiloxane-dimethylsiloxane copolymer having both terminal ends of the molecular chain blocked by trimethylsiloxy groups, a methylhydrogensiloxane-dimethylsiloxane copolymer having both terminal ends of the molecular chain blocked by dimethylhydrogensiloxy groups, and an organosiloxane copolymer made up of siloxane units represented by the formula $(CH_3)_3SiO_{1/2}$, siloxane units represented by the formula $(CH_3)_2HSiO_{1/2}$, and siloxane units represented by the formula $SiO_{4/2}$.

In the present composition, the content of the organopolysiloxane should be such that the amount of silicon-bonded hydrogen atoms in the present component is within the range of from 0.1 mol to 1.5 mol per 1 mol of silicon-bonded alkenyl groups in component (A). This is due to the fact that when the content of the present component is lower than the lower limit of the above-mentioned range, the resultant silicone rubber composition does not cure completely, and, on the other hand, when it exceeds the upper limit of the above-mentioned range, the resultant silicone rubber becomes extremely hard, and its surface cracks easily.

The platinum catalyst is a catalyst used for promoting the curing of the present composition. Chloroplatinic acid, alcohol solutions of chloroplatinic acid, olefin complexes of platinum, alkenylsiloxane complexes of platinum, and platinum carbonyl complexes are suggested as examples thereof.

In the present composition, the content of the platinum catalyst is such that the amount of the platinum metal contained in the present component, by weight, is within the range of from 0.01 ppm to 1,000 ppm, and preferably, within the range of from 0.1 ppm to 500 ppm, based on component (A). When the content of the present component is lower than the lower limit of the above-mentioned range, the resultant silicone rubber composition does not cure completely, and, on the other hand, adding an amount exceeding the upper limit of the above-mentioned range does not lead to an increase in the cure rate of the resultant silicone rubber composition.

In addition, when the present composition is condensation-curable, component (B) is a silane having at least three silicon-bonded groups hydrolyzable groups in one molecule, a partial hydrolysis product thereof, and, if necessary, a condensation reaction catalyst. Examples of silicon-bonded hydrolyzable groups include methoxy, ethoxy, propoxy, and other alkoxy groups; methoxyethoxy, ethoxyethoxy, methoxypropoxy and other alkoxyalkoxy groups; acetoxy, octanoyloxy and other acyloxy groups; dimethylketoxime, methylethylketoxime, and other ketoxime groups; isopropenyloxy, 1-ethyl-2-methylvinyloxy and other alkenyloxy groups; dimethylamino, diethylamino, butylamino, and other amino groups; dimethylaminoxy, diethylaminoxy, and other aminoxy groups; N-methylacetamide, and N-ethylacetamide. In addition, hydrocarbon groups may be bonded to the silane. Examples of such hydrocarbon groups include methyl, ethyl, propyl, butyl, pentyl, hexyl, heptyl, octyl, nonyl, decyl, octadecyl, and other alkyl groups; cyclopentyl, cyclohexyl, and other cycloalkyl groups; vinyl, allyl, and other alkenyl groups; phenyl, tolyl, xylyl, naphthyl, and other aryl groups; benzyl, phenetyl, phenylpropyl and other aralkyl groups, and 3-chloropropyl, 3,3,3-trifluoropropyl and other halogenated alkyl groups. Methyltriethoxysilane, vinyltriethoxysilane, vinyltriethoxysilane, vinyltriacetoxysilane, and ethyl orthosilicate are suggested as examples of the silane or its partial hydrolysis products.

In the present composition, the content of the silane or its partial hydrolysis products is preferably within the range of from 0.01 parts by weight to 20 parts by weight, and, especially preferably, within the range of from 0.1 parts by weight to 10 parts by weight, per 100 parts by weight of component (A). When the content of the silane or its partial hydrolysis product is lower than the lower limit of the above-mentioned range, the storage stability of the resultant composition tends to deteriorate and its adhesive properties tend to decrease, and, on the other hand, when it exceeds the upper limit of the above-mentioned range, the rate of curing of the resultant composition tends to considerably slow down.

In addition, the condensation reaction catalyst is an optional component; thus, for example, when a silane having aminoxy groups, amino groups, ketoxime groups, etc. is used as the curing agent, it is not necessary. Examples of such condensation reaction catalysts include tetrabutyl titanate, tetraisopropyl titanate, and other titanic acid esters; diisopropoxybis(acetylacetato)titanium, diisopropoxybis (ethylacetoacetato)titanium, and other chelated organotitanium compounds; aluminum tris(acetylacetonate), aluminum tris(ethylacetoacetate), and other organoaluminum compounds; zirconium tetra(acetylacetotonate), zirconium tetrabutylate, and other organozirconium compounds; dibutyltin dioctoate, dibutyltin dilaurate, dibutyltin-2-etylhexoate, and other organotin compounds; tin naphthenoate, tin oleate, tin butylate, cobalt naphthenoate, zinc stearate, and other metal salts of organic carboxylic acids; hexylamine, dodecylamine phosphate, and other amine compounds and their salts; benzyltriethylammonium acetate, and other quaternary ammonium salts; lower fatty acid salts of alkali metals such as lithium nitrate and potassium acetate; dimethylhydroxylamine, diethylhydroxylamine, and other dialkylhydroxylamines; and guanidyl group-containing organosilicon compounds, and the like.

Although the content of the condensation reaction catalyst is not critical; preferably, it is within the range of from 0.01 parts by weight to 20 parts by weight, and, especially preferably, within the range of from 0.1 parts by weight to 10 parts by weight, per 100 parts by weight of component (A). When this catalyst is necessary, if the content of the catalyst is lower than the lower limit of the above-mentioned range, the resultant composition often does not cure completely, and, on the other hand, when it exceeds the upper limit of the above-mentioned range, the storage stability of the resultant composition tends to deteriorate.

In addition, when the present composition is free radical-curable, component (B) is an organic peroxide. Examples of such organic peroxides include benzoyl peroxide, dicumyl peroxide, 2,5-dimethylbis(2,5-t-butylperoxy)hexane, di-t-butyl peroxide, and t-butyl perbenzoate. The amount, in which the organic peroxides are added, is within the range of from 0.1 parts by weight to 5 parts by weight per 100 parts by weight of the above-described organopolysiloxane of component (A).

Component (C) is a filler prepared by treating the surface of a thermally conductive filler with an oligosiloxane having a formula selected from (i) $(R^1O)_a Si(OSiR^2_3)_{(4-a)}$ and (ii) $(R^1O)_a R^2_{(3-a)} SiO[R^2_2 SiO]_n Si(OSiR^2_3)_b R^2_{(3-b)}$ wherein $R^1$ is alkyl, each $R^2$ is independently a monovalent hydrocarbon group free of aliphatic unsaturation, subscript a is an integer from 1 to 3, b is an integer from 1 to 3, and n is an integer greater than or equal to 0. Component (C) is used to impart thermal conductivity to the resultant silicone rubber.

The thermally conductive filler of component (C) is exemplified by aluminum powder, copper powder, nickel powder, and other metal powders; alumina powder, magnesium oxide powder, beryllium oxide powder, chromium oxide powder, titanium oxide powder, and other metal oxide powders; boron nitride powder, aluminum nitride powder, and other metal nitride powders; boron carbide powder, titanium carbide powder, silicon carbide powder, and other metal carbide powders. In particular, when electrical insulating properties are required of the resultant silicone rubber, metal oxide powders, metal nitride powders, or metal carbide powders are preferred, and alumina powders are particularly preferred. Either a single type of powder, or a combination of two or more powders described above can be used as the thermally conductive filler of component (C).

Although there are no limitations concerning the average particle size of the thermally conductive filler, preferably, it is within the range of from 0.1 μm to 100 μm. In addition, when an alumina powder is used as the thermally conductive filler of component (C), it is preferably a mixture of a first spherical alumina powder with an average particle size of from 5 μm to 50 μm and a second spherical or irregular-shaped alumina powder with an average particle size of from 0.1 μm to 5 μm; and, in particular, it is a mixture comprising from 30 weight percent to 90 weight percent of the first spherical alumina powder and 10 weight percent to 60 weight percent of the second spherical alumina powder.

There are no limitations concerning the content of the thermally conductive filler, but in order to form silicone rubber of excellent thermal conductivity, the content is preferably within the range of from 500 parts by weight to 2,500 parts by weight, more preferably, within the range of from 500 parts by weight to 2,000 parts by weight, and especially preferably, within the range of from 800 parts by weight to 2,000 parts by weight, per 100 parts by weight of component (A). When the content of the thermally conductive filler is lower than the lower limit of the above-mentioned range, it undergoes settling and separation during long-term storage, which may lead to insufficient thermal conductivity in the resultant silicone rubber; on the other hand, when it exceeds the upper limit of the above-mentioned range, it may become impossible to achieve a uniform dispersion of the thermally conductive filler in the resultant silicone rubber.

In the above formulae for the oligosiloxane of component (C), $R^1$ represents an alkyl group. Examples of alkyl groups include methyl, ethyl, propyl, butyl, hexyl, decyl or another linear alkyl; isopropyl, tertiary butyl, isobutyl, or another branched alkyl; and cyclohexyl, or another cyclic alkyl. Preferably, $R^1$ is alkyl having 1 to 4 carbon atoms, and, more preferably, $R^1$ is methyl or ethyl. Each $R^2$ which may be the same or different, in the formulae for the oligosiloxane represents a monovalent hydrocarbon group free of aliphatic unsaturation. $R^2$ is exemplified by methyl, ethyl, propyl, butyl, hexyl, decyl, undecyl, dodecyl, tridecyl, tetradecyl, pentadecyl, hexadecyl, heptadecyl, octadecyl, nonadecyl, eicosyl; isopropyl, tertiary butyl, isobutyl, 2-methylundecyl, 1-hexylheptyl, or another branched alkyl group; cyclohexyl, cyclododecyl, or another cyclic alkyl group; phenyl, tolyl, xylyl, or another aryl group; and benzyl, phenetyl, 2-(2,4, 6-trimethylphenyl)propyl, or another aralkyl group are suggested as examples thereof. Of the preceding groups, linear alkyl groups are preferred. Also, subscript a in the formulae for the oligosiloxane is an integer from 1 to 3 and preferably is 3. Also subscript b in the above formulae is an integer of 1 to 3 and preferably is 3. Also, subscript n in the above formulae is an integer of 0 or greater, preferably, an integer of 0 to 100, more preferably, an integer of 0 to 50, and, especially preferably, an integer of 0 to 10.

Examples of oligosiloxane (i) include, but are not limited to, the following:

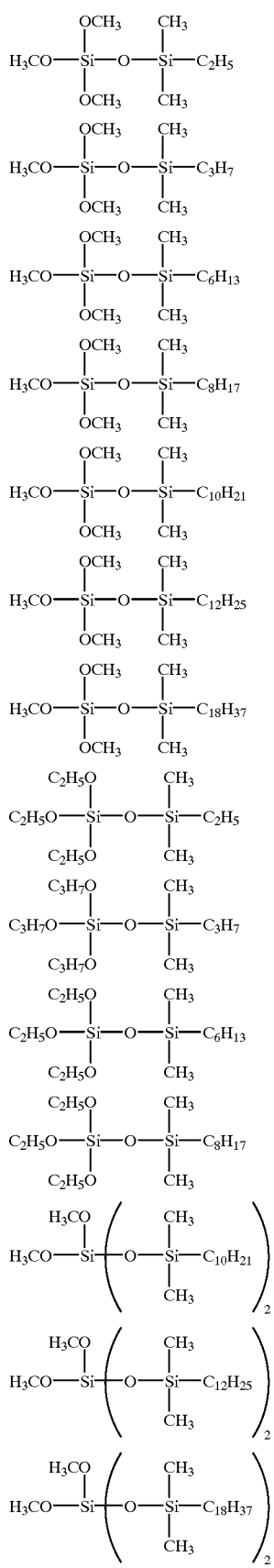

Oligosiloxane (ii) is exemplified by the following compounds: $(CH_3O)_3SiO[(CH_3)_2SiO]_3Si(CH_3)_3$, $(C_2H_5O)_3SiO[(CH_3)_2SiO]_3Si(CH_3)_3$, $(CH_3O)_2CH_3SiO[(CH_3)_2SiO]_3Si(CH_3)_3$, and $(CH_3O)_3SiO[(CH_3)_2SiO]_{10}Si(CH_3)_3$.

Oligosiloxane (i) can be prepared, for example, by reacting an oligosiloxane having the formula:

$$(R^1O)_aSi(OSiR^2_2H)_{(4-a)}$$

with a hydrocarbon compound having one aliphatic double bond per molecule in the presence of a platinum catalyst.

Examples of oligosiloxanes having silicon-bonded hydrogen atoms include trimethoxysiloxydimethylsilane, triethoxysiloxydimethylsilane, tripropoxysiloxydimethylsilane, and other trialkoxysiloxydialkylsilane compounds; bis(dimethylsiloxy)dimethoxysilane, bis(dimethylsiloxy)diethoxysilane, bis(dimethylsiloxy)dipropoxysilane, bis(dimethylsiloxy)dibutoxysilane, and other bis(dialkylsiloxy)dialkoxysilane compounds; tris(dimethylsiloxy)methoxysilane, tris(dimethylsiloxy)ethoxysilane, tris(dimethylsiloxy)propoxysilane, tris(dimethylsiloxy)butoxysilane, and other tris(dialkylsiloxy)alkoxysilane compounds.

Examples of hydrocarbon compounds having one aliphatic double bond per molecule include ethylene, propene, 1-butene, 2-butene, 1-pentene, 1-hexene, 2-hexene, 3-hexene, 1-heptene, 1-octene, 1-nonene, 1-decene, 1-undecene, 1-dodecene, 1-tridecene, 6-tridecene, 1-tetradecene, 1-pentadecene, 1-hexadecene, 1-heptadecene, 1-octadecene, 1-nonadecene, 1-eicocene, and other linear aliphatic hydrocarbon compounds; 2-methylundecene, and other branched aliphatic hydrocarbon compounds; cyclodecene and other cyclic aliphatic hydrocarbon compounds; 2-(2,4,6-trimethylphenyl)propene and other aliphatic aromatic hydrocarbon compounds containing double bonds.

Examples of platinum catalysts include chloroplatinic acid, alcohol solutions of chloroplatinic acid, olefin complexes of platinum, alkenylsiloxane complexes of platinum, and carbonyl complexes of platinum.

There are no limitations concerning the amount of the oligosiloxane as long as after surface treatment it permits improvement in the dispersibility of the thermally conductive filler in the resultant thermally conductive silicone rubber composition; preferably, however, it is within the range of from 0.1 parts by weight to 10 parts by weight, and, especially preferably, within the range of from 0.1 parts by weight to 5 parts by weight, per 100 parts by weight of the thermally conductive filler. This is due to the fact that if the composition contains a large amount of thermally conductive filler, when the content of the oligosiloxane is lower than the lower limit of the above-mentioned range, the moldability of the resultant silicone rubber composition deteriorates and the thermally conductive filler undergoes settling and separation from the resultant silicone rubber composition during storage; on the other hand, when it exceeds the upper limit of the above-mentioned range, the mechanical strength of the resultant silicone rubber may decrease.

Methods for treating the surface of the thermally conductive filler with the oligosiloxane include, for example, a process in which the thermally conductive filler and the oligosiloxane are blended and the surface of the thermally conductive filler is treated with the oligosiloxane in advance, and a process in which after mixing component (A) and the thermally conductive filler, the oligosiloxane is added thereto, treating the surface of the thermally conductive filler within component (A).

Furthermore, so long as this does not impair the purpose of the present invention, the composition may contain additional ingredients, such as fumed silica, precipitated silica, fumed titanium oxide, and other fillers, fillers obtained by rendering the surface of the above fillers hydrophobic by treating it with an organosilicon compound; acetylene compounds, hydrazine compounds, phosphine compounds, mercaptan compounds, and other addition reaction inhibitors; and, moreover, pigments, dyes, fluorescent dyestuffs, heat resistance additives, flame retarders other than triazole compounds, plasticizers, and tackifiers.

There are no limitations concerning the process used for curing the present composition. For example, one may use a process, in which the present composition is subjected to molding and then allowed to stand at room temperature, or a process, in which the present composition is subjected to molding and then heated to 50° C.~200° C.

In addition, although there are no limitations concerning the properties of the resultant silicone rubber, high-hardness rubber to low-hardness rubber, in other words, gel-like rubber, are suggested as examples. Because the resultant silicone rubber can be caused to firmly adhere to parts as heat-dissipating material and due to the resultant excellent handling properties, its Type E durometer hardness as defined in JIS K 6253 should preferably be within the range of from 5 to 90.

The thermally conductive silicone rubber composition of the present invention is characterized by excellent handling properties and moldability even though it contains a large amount of thermally conductive filler added in order to obtain silicone rubber of high thermal conductivity.

EXAMPLES

The thermally conductive silicone rubber composition of the present invention will now be explained in detail by referring to application examples. Also, the characteristics indicated in the application examples are expressed in values measured at 25° C. In addition, the characteristics of the thermally conductive silicone rubber composition were measured in the following manner.

Consistency of the Thermally Conductive Silicone Rubber Composition

A 50-mL glass beaker was filled with a thermally conductive silicone rubber composition and the ¼-scale cone consistency of the composition was measured in accordance with the method specified in JIS K 2220. It should be noted that a high value of consistency means that the plasticity of a thermally conductive silicone rubber composition is high and its handling properties are excellent.

Moldability of the Thermally Conductive Silicone Rubber Composition

A 1-mm layer of a thermally conductive silicone rubber composition of the hydrosilation curable type was sandwiched between 50-μm films made of PET (polyethylene terephthalate) and cured under heating at 100° C. for 30 minutes. Subsequently, the PET films were peeled off, and the formed silicone rubber sheet was subjected to examination. Cases, in which a sheet could be formed without any problems, were evaluated as ◯: excellent moldability; cases, in which a sheet could be formed notwithstanding partial cohesive failure, were evaluated as Δ: slightly inferior moldability; and cases, in which a sheet could not be formed, were evaluated as ×: unsatisfactory moldability.

Additionally, a thermally conductive silicone rubber composition of the condensation curable type was spread onto a 50-μm PET film to produce a layer with a thickness of 1 mm and allowed to stand at room temperature for 1 week, whereupon the PET film was peeled off, and the formed silicone rubber sheet was examined and evaluated in the same manner as described above.

Thermal Conductivity of the Silicone Rubber

The thermal conductivity of the silicone rubber was measured in accordance with the hot-wire method specified in JIS R 2616 using a Quick Thermal Conductivity Meter, Model QTM-500, available from Kyoto Electronics Manufacturing Co., Ltd.

Hardness of the Silicone Rubber

The hardness of the silicone rubber was measured using a Type E durometer as specified in JIS K 6253.

Example 1

450 parts by weight of a perfectly spherical alumina powder with an average particle size of 10 μm, 450 parts by weight of an irregular-shaped alumina powder with an average particle size of 2.2 μm, and 5 parts by weight of oligosiloxane represented by the formula:

$$(CH_3O)_3SiOSi(CH_3)_2C_{12}H_{25}$$

were put in a V-blender and subjected to agitation for 2 hours at 160° C. under a nitrogen gas atmosphere to prepare a surface treated alumina powder. Then, to prepare a thermally conductive silicone rubber composition, all of the alumina powder was uniformly blended with 98 parts by weight of dimethylpolysiloxane with a viscosity of 930 mPa·s having, on the average, one silicon-bonded vinyl group per molecule (content of vinyl groups=0.11 weight percent), in which the terminal ends of the molecular chain were blocked by a dimethylvinylsiloxy group and a trimethylsiloxy group, 0.54 parts by weight of copolymer of methylhydrogensiloxane and dimethylsiloxane with a viscosity of 4 mPa·s having both terminal ends of the molecular chain blocked by trimethylsiloxy groups, and 0.2 parts by weight of 1,3-divinyl-1,1,3,3-tetramethyldisiloxane complex of platinum with a platinum content of 0.5 weight percent. The characteristics of the thermally conductive silicone rubber composition are listed in Table 1.

Comparative Example 1

With the exception of using an alumina powder surface-treated by putting 450 parts by weight of a perfectly spherical alumina powder with an average particle size of 10 μm, 450 parts by weight of an irregular-shaped alumina powder with an average particle size of 2.2 μm, and 10 parts by weight of methyltrimethoxysilane in a V-blender and subjecting them to agitation for 2 hours at 160° C. under a nitrogen gas atmosphere instead of the surface treated alumina powder used in Example 1, a thermally conductive silicone rubber composition was prepared in the same manner as in Example 1. The characteristics of the thermally conductive silicone rubber composition are listed in Table 1.

Comparative Example 2

With the exception of using an alumina powder surface treated by putting 350 parts by weight of a perfectly spherical alumina powder with an average particle size of 10 μm, 400 parts by weight of an irregular-shaped alumina powder with an average particle size of 2.2 μm, and 5 parts by weight of methyltrimethoxysilane in a V-blender and subjecting them to agitation for 2 hours at 160° C. under a nitrogen gas atmosphere instead of the surface treated alumina powder used in Comparative Example 1, a thermally conductive silicone rubber composition was prepared in the same manner as in Comparative Example 1. The characteristics of the thermally conductive silicone rubber composition are listed in Table 1.

Comparative Example 3

With the exception of using an alumina powder surface treated by putting 450 parts by weight of a perfectly spherical alumina powder with an average particle size of 10 μm, 450 parts by weight of an irregular-shaped alumina powder with an average particle size of 2.2 μm, and 5 parts by weight of oligosiloxane represented by the formula:

$(CH_3)_3SiO[(CH_3)_2SiO]_3Si(CH_3)_3$ in a V-blender and subjecting them to agitation for 2 hours at 160° C. under a nitrogen gas atmosphere instead of the surface treated alumina powder used in Example 1, a thermally conductive silicone rubber composition was prepared in the same manner as in Example 1. The characteristics of the thermally conductive silicone rubber composition are listed in Table 1.

Comparative Example 4

With the exception of using 0.49 parts by weight of methylhydrogensiloxane-dimethylsiloxane copolymer with a viscosity of 4 mPa·s having both terminal ends of the molecular chain blocked by trimethylsiloxy groups and using a mixture of 450 parts by weight of a perfectly spherical powder with an average particle size of 10 μm and 450 parts by weight of an irregular-shaped alumina powder with an average particle size of 2.2 μm instead of the surface treated alumina powder used in Example 1, a thermally conductive silicone rubber composition was prepared in the same manner as in Example 1. The characteristics of the thermally conductive silicone rubber composition are listed in Table 1.

Example 2

After mixing 95 parts by weight of dimethylpolysiloxane with a viscosity of 360 mPa·s having both terminal ends of the molecular chain blocked by dimethylvinylsiloxy groups (vinyl group content=0.48 weight percent), 450 parts by weight of a perfectly spherical alumina powder with an average particle size of 10 μm, 450 parts by weight of an irregular-shaped alumina powder with an average particle size of 2.2 μm, and 10 parts by weight of oligosiloxane represented by the formula:

$(CH_3O)_3SiO[(CH_3)_2SiO]_3Si(CH_3)_3,$ to prepare a thermally conductive silicone rubber composition, 0.87 parts by weight of dimethylpolysiloxane with a viscosity of 16 mPa·s having both terminal ends of the molecular chain blocked by dimethylhydrogensiloxy groups (content of silicon-bonded hydrogen atoms=0.13 weight percent), 0.87 parts by weight of methylhydrogensiloxane-dimethylsiloxane copolymer with a viscosity of 4 mPa·s having both terminal ends of the molecular chain blocked by trimethylsiloxy groups (content of silicon-bonded hydrogen atoms=0.78 weight percent), and 0.2 parts by weight of 1,3-divinyl-1,1,3,3-tetramethyldisiloxane complex of platinum with a platinum content of 0.5 weight percent were uniformly blended therewith. The characteristics of the thermally conductive silicone rubber composition are listed in Table 1.

Comparative Example 5

With the exception of using 90 parts by weight of dimethylpolysiloxane with a viscosity of 360 mPa·s having both terminal ends of the molecular chain blocked by dimethylvinylsiloxy groups and adding 5 parts by weight of 3-glycidoxypropyltrimethoxysilane instead of the oligosiloxane used in Example 2, a thermally conductive silicone rubber composition was prepared in the same manner as in Example 2. The characteristics of the thermally conductive silicone rubber composition are listed in Table 1.

Example 3

After mixing 94 parts by weight of organopolysiloxane with a viscosity of 800 mPa·s consisting of 93.50 mole percent of siloxane units represented by the formula $(CH_3)_2SiO_{2/2}$, 3.30 mole percent of siloxane units represented by the formula $CH_3SiO_{3/2}$, 2.60 mole percent of siloxane units represented by the formula $(CH_3)_3SiO_{1/2}$, and 0.60 mole percent of siloxane units represented by the formula $(CH_3)_2(CH_2=CH)SiO_{1/2}$ (vinyl group content=0.22 weight percent), 450 parts by weight of a perfectly spherical alumina powder with an average particle size of 10 μm, 450 parts by weight of an irregular shaped alumina powder with an average particle size of 2.2 μm, and 5 parts by weight of oligosiloxane represented by the formula:

$(CH_3O)_3SiO[(CH_3)_2SiO]_3Si(CH_3)_3,$ to prepare a thermally conductive silicone rubber composition, 6.03 parts by weight of dimethylpolysiloxane with a viscosity of 16 mPa·s having both terminal ends of the molecular chain blocked by methylhydrogensiloxy groups (content of silicon-bonded hydrogen atoms=0.13 weight percent) and 0.2 parts by weight of 1,3-divinyl-1,1,3,3-tetramethyldisiloxane complex of platinum with a platinum content of 0.5 weight percent were uniformly blended therewith. The characteristics of the thermally conductive silicone rubber composition are listed in Table 1.

Example 4

After mixing 94 parts by weight of dimethylpolysiloxane with a viscosity of 700 mPa·s having both terminal ends of the molecular chain blocked by trimethoxysiloxy groups, 450 parts by weight of a perfectly spherical alumina powder with an average particle size of 10 μm, 450 parts by weight of an irregular shaped alumina powder with an average particle size of 2.2 μm, and 5 parts by weight of oligosiloxane represented by the formula:

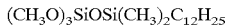

$(CH_3O)_3SiOSi(CH_3)_2C_{12}H_{25}$ 3 parts by weight of methyltrimethoxysilane and 3 parts by weight of tetra(n-butyl) titanate were uniformly blended therewith to prepare a thermally conductive silicone rubber composition. The characteristics of the thermally conductive silicone rubber composition are listed in Table 1.

Comparative Example 6

With the exception of adding 3 parts by weight of 3-glycidoxypropyltrimethoxysilane instead of the oligosiloxane used in Example 4, a thermally conductive silicone rubber composition was prepared in the same manner as in Example 4. The characteristics of the thermally conductive silicone rubber composition are listed in Table 1.

TABLE 1

| | Examples | | | | | | | | | |
|---|---|---|---|---|---|---|---|---|---|---|
| Parameters | Application Ex. 1 | Application Ex. 2 | Application Ex. 3 | Application Ex. 4 | Comparative Ex. 1 | Comparative Ex. 2 | Comparative Ex. 3 | Comparative Ex. 4 | Comparative Ex. 5 | Comparative Ex. 6 |
| Consistency (mm/10) | 80 | 90 | 85 | 77 | 40 | 85 | 25 | 20 | 18 | 28 |
| Moldability | ○ | ○ | ○~Δ | ○ | ×~Δ | ○ | × | × | × | ×~Δ |
| Coefficient of thermal conductivity (W/m · k) | 5.2 | 4.8 | 4.5 | 4.5 | 3.8 | 1.8 | — | — | — | 4.5 |
| Hardness | 37 | 55 | 45 | 52 | 58 | 50 | — | — | — | 30 |

That which is claimed is:

1. A thermally conductive silicone rubber composition, comprising:

(A) a curable organopolysiloxane;

(B) a curing agent; and (C) a filler prepared by treating the surface of a thermally conductive filler with an oligosiloxane having a formula selected from (i) $(R^1O)_aSi(OSiR^2_3)_{(4-a)}$ and (ii) $(R^1O)_aR^2_{(3-a)}SiO[R^2_2SiO]_nSi(OSiR^2_3)_bR^2_{(3-b)}$ wherein $R^1$ is alkyl, each $R^2$ is independently a monovalent hydrocarbon group free of aliphatic unsaturation, subscript a is an integer from 1 to 3, b is an integer from 1 to 3, and n is an integer having a value greater than or equal to 0.

2. The composition according to claim 1, wherein the composition cures by a reaction selected from hydrosilation, condensation, and free-radical.

3. The composition according to claim 2, wherein the composition is a hydrosilation-curable composition wherein component (A) is an organopolysiloxane having an average of at least 0.1 silicon-bonded alkenyl group per molecule, and component (B) comprises a platinum catalyst and an organopolysiloxane having an average of at least two silicon-bonded hydrogen atoms per molecule.

4. The composition according to claim 2, wherein the composition is a condensation-curable composition wherein component (A) is an organopolysiloxane having at least two silanol groups or silicon-bonded hydolyzable groups per molecule, and component (B) is a silane having at least three silicon-bonded hydrolzsable groups per molecule or a partial hydrolysis product thereof and, optionally, a condensation catalyst.

5. The composition according to claim 2, wherein the composition is a free radical curable-composition wherein component (A) is an organopolysiloxane having at least one silicon-bonded alkenyl group per molecule, and component (B) is an organic peroxide.

6. The composition according to claim 1, wherein the thermally conductive filler is an alumina powder.

7. The composition according to claim 6, wherein the alumina powder is a mixture comprising first spherical alumina powder having an average particle size of from 5 to 50 μm and a second spherical or irregular-shaped alumina powder having a average particle size of form 0.1 to 5 μm.

8. The composition according to claim 7, wherein the mixture comprises from 30 to 90 weight percent of the first alumina powder and from 10 to 60 weight percent of the second alumina powder.

9. The composition according to claim 1, wherein the thermally conductive filler has an average particle size of from 0.1 to 100 μm.

10. The composition according to claim 1, wherein the concentration of the thermally conductive filler is from 500 to 2,500 parts by weight per 100 parts by weight of component (A).

11. The composition according to claim 1, wherein the oligosiloxane has the formula $(R^1O)_aSi(OSiR^2_3)_{(4-a)}$.

12. The composition according to claim 11, wherein $R^1$ is $C_1$ to $C_4$ alkyl and $R^2$ is a linear alkyl group.

13. The composition according to claim 11, wherein subscript a is 3.

14. The composition according to claim 1, wherein the oligosiloxane has the formula $(R^1O)_aR^2_{(3-a)}SiO[R^2_2SiO]_nSi(OSiR^2_3)_bR^2_{(3-b)}$.

15. The composition according to claim 14, wherein $R^1$ is $C_1$ to $C_4$ alkyl and $R^2$ is a linear alkyl group.

16. The composition according to claim 15, wherein a is 3, b is 3, and n is an integer from 0 to 100.

* * * * *